Dec. 22, 1936.    M. F. WATERS    2,064,962
OIL AND GAS SEPARATOR
Filed Aug. 7, 1935    2 Sheets-Sheet 1

Inventor
M. F. Waters,
By
Attorneys

Dec. 22, 1936.　　　　M. F. WATERS　　　　2,064,962
OIL AND GAS SEPARATOR
Filed Aug. 7, 1935　　　　2 Sheets-Sheet 2
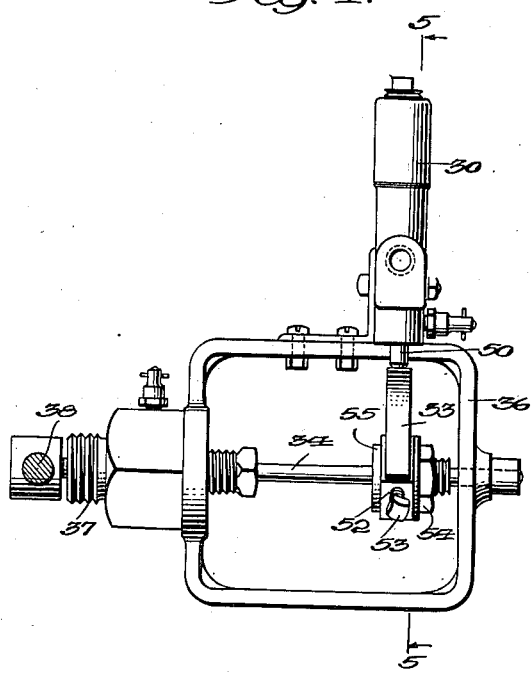
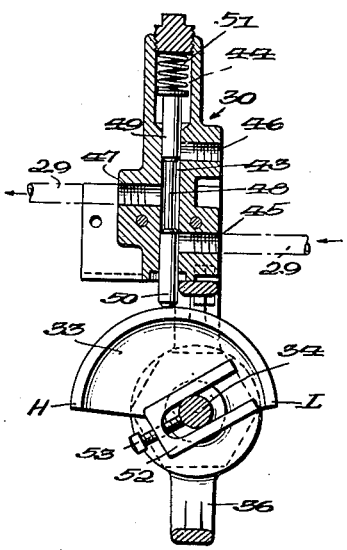
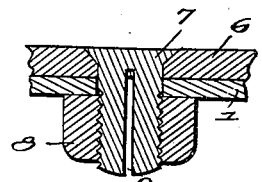
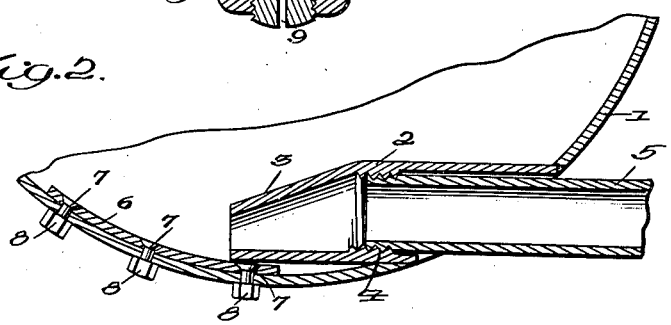
Inventor
M. F. Waters,
By Prevost & Prevost
Attorneys Patented Dec. 22, 1936

2,064,962

UNITED STATES PATENT OFFICE 2,064,962

OIL AND GAS SEPARATOR

Millard F. Waters, Tulsa, Okla., assignor to Hanlon-Waters, Inc., Tulsa, Okla.

Application August 7, 1935, Serial No. 35,215

10 Claims. (Cl. 183—2.7)

My invention consists in new and useful improvements in an oil and gas separator and relates more particularly to a novel inlet device for the mixture of oil, gas and sand entering the separator, and a novel means of controlling the discharge of the separated oil and gas.

It is the primary object of my invention to provide a control mechanism for the oil and gas discharge lines wherein the pressure carried on the separator is controlled by the liquid level inside the separator tank, the controls for the separate valves being so arranged that only sufficient pressure is carried at any time to assist in discharging the liquid from the separator. Thus as soon as the liquid rises in the separator above a predetermined level, the gas valve is closed, which in turn starts the building up of pressure in the separator until the liquid has been discharged.

Another object of my invention is to provide in combination with a float controlled gas outlet valve, a pilot actuated motor valve for controlling the oil discharge, the operation of said pilot valve being effected by the level of the liquid in the tank through the medium of a float cage arranged in communication with the separator, the source of operating fluid for the motor valve being dry gas taken from a point adjacent the gas outlet of the separating element in the upper portion of the tank.

A further object of my invention is to so corelate the operation of the oil and gas valves without in any way operatively connecting the same together, that when the oil valve opens, the gas valve will close, and vice versa.

A still further object of my invention resides in my improved inlet nozzle and protecting plate for the shell of the tank, whereby the incoming mixture of oil, gas and sand is introduced tangentially into the tank and directed against an inlet protector plate which spreads the mixture in a thin film on the inner wall of the tank and starts it in a centrifugal path around said wall.

Still another object of my invention is to provide means for detecting a worn protector plate, whereby the same may be replaced in ample time before it has become so worn as to endanger the shell adjacent the inlet.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a view in side elevation showing a separator tank equipped with my improved inlet, and oil and gas control means.

Fig. 2 is an enlarged fragmentary sectional view of the inlet and protector plate.

Fig. 3 is a still more enlarged sectional view of the protector plate and leak bolt.

Fig. 4 is an enlarged elevation of the oil control pilot valve assembly, and

Fig. 5 is a sectional view taken on line 5—5 of Fig. 4.

Figure 1:
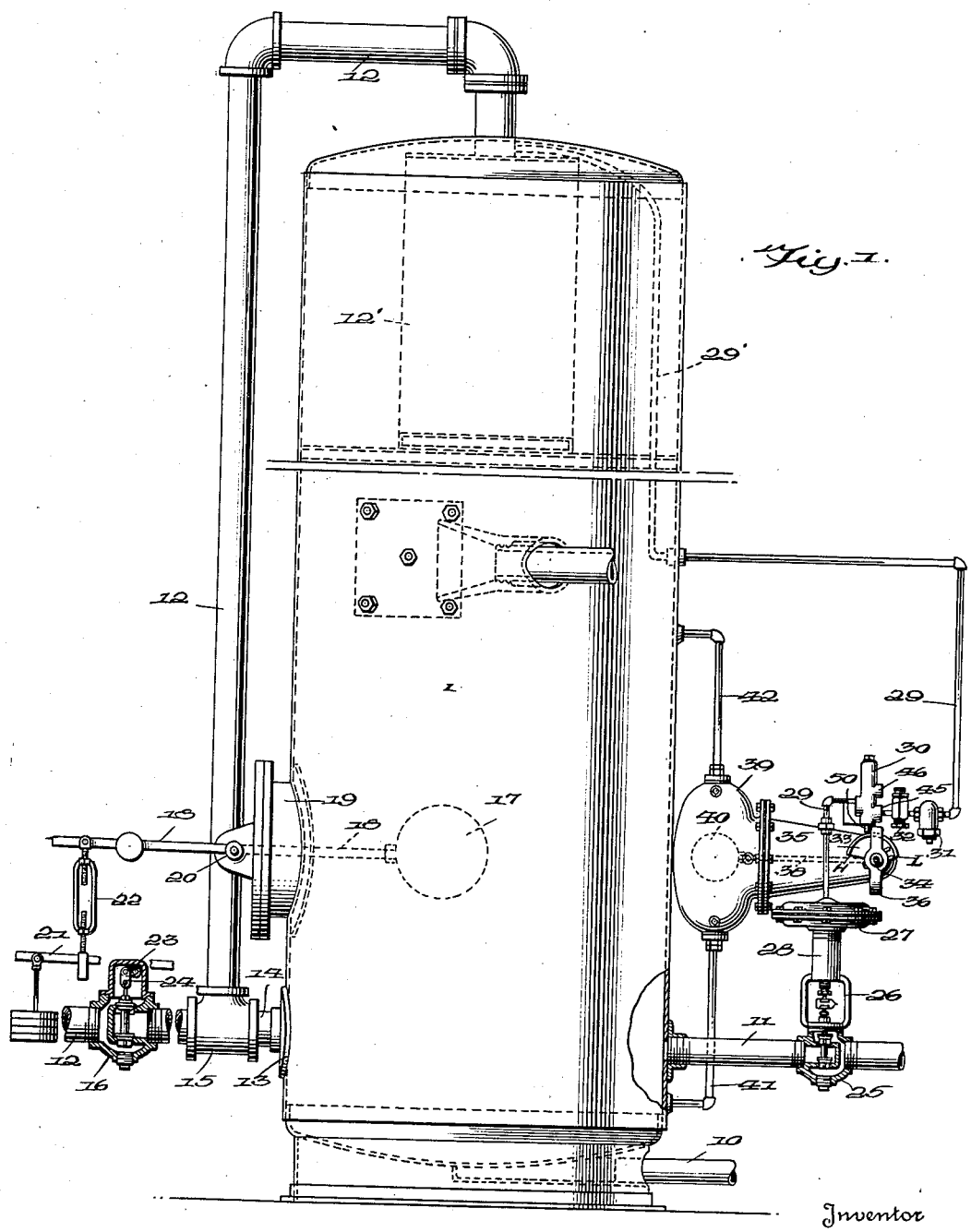

In the drawings, I represents a conventional oil and gas separator tank in the wall of which at a suitable point intermediate its vertical extremities I provide a novel inlet sleeve 2 which is welded to the shell of the tank I and extends tangentially inwardly and terminates in a vertically flaring nozzle 3, the latter being directed toward the shell of the tank at an angle, as clearly shown in Fig. 2. The inner end of the sleeve 2 adjacent the nozzle is threaded as at 4 to engage complementary threads on an inlet pipe 5 which is adapted to be inserted within the sleeve.

Immediately adjacent the discharge end of the nozzle 3, and directly in line of its discharge, I provide a protector plate 6 which is bolted to the inner wall of the tank I by a series of leak bolts 7.

Referring to Fig. 3 which is an enlarged view of one of these leak bolts, it will be seen that the bolt 7 extends through the protector plate 6 with its inner end flaring and counter-sunk therein so as to lie in the same plane with the exposed face of the protector plate, said bolt projecting outwardly through the shell I, its outer end being threaded to engage a suitable nut 8. The bolt 7 is drilled longitudinally as at 9 from its outer end to a point just beyond the separator shell. Thus, as the liquid and sand enter the separator through the inlet pipe 5 and nozzle 3, it is discharged on the protector plate in a thin film, and as wear and erosion occurs, it will effect the inner end of the bolt 7 to the same extent as it does the protector plate. Hence, after it has worn away the protector plate and the head of one or more of these bolts 7 to a point adjacent the inner end of the drilled opening 9, liquid and gas will leak through the opening 9 to the outside of the shell, thus indicating to the operator that the protector plate should be replaced.

The operator can then turn out the separator and replace the protector plate with a new one and new bolts before any damage has been done to the shell of the separator itself.

The lower end of the separator tank 1 is provided with a conventional settling chamber opening into a sand draw-off 10, and at a suitable point above the lower extremity of the settling chamber, I provide an oil outlet line 11. The gas outlet line 12 leads from the upper extremity of the tank and extends over and down along the outside of the shell, being secured to the shell of the tank by a suitable deadhead flange 13 arranged preferably diametrically opposite to the oil discharge line 11. From this flange 13, I extend a short nipple 14 which supports a T 15 connected into the gas line 12 and providing for a horizontal bend therein. Thus I provide an oil discharge line 11 leading horizontally from one side of the tank, and a gas discharge line 12 which terminates in a horizontal portion preferably diametrically opposite the oil line 11.

Adjacent the inlet to the gas discharge line 12, I provide a suitable mist extractor or separating element 12' which may be of any conventional design, preferably of the type shown in either of my former Patents Nos. 1,910,728, May 23, 1933, and 1,999,950, April 30, 1935, whereby a dry gas is discharged from the separator through line 12 and also used as the operating medium for the oil discharge motor valve hereinafter described.

16 represents a gas valve mounted in the horizontal portion of the gas line 12 and operated by a float 17 located in the separator tank 1. This float is provided with a float arm 18 which extends through a manhole 19 and is pivotally mounted at 20 in a suitable stuffing box arrangement on the manhole flange, the outer end of said float arm 18 being loosely connected to a weighted lever 21 through the medium of a conventional turnbuckle 22. The valve lever 21 is pivoted at 23 and through links 24, is operatively connected to the movable members of the valve 16. Thus, as the float 17 rises to a predetermined point due to the rise of the liquid level in the tank, the outer end of the float arm 18 is forced downwardly and in turn forces the valve lever 21 downwardly to close the valve 16, and as the liquid level drops, the reverse operation of the valve occurs.

The oil valve 25 interposed in the oil line 11 is of the motor valve type and carries by means of a yoke 26, a valve diaphragm 27, the movable member of the valve being normally forced upwardly by a conventional spring in the cylindrical portion 28. The top of the diaphragm chamber is connected by line 29 to the gas outlet at the upper portion of the separator tank 1, said line 29 extending through the shell of the tank and upwardly therein as shown in dotted lines at 29' in Fig. 1.

A pilot valve 30, hereinafter described in detail, is interposed in the gas line 29 immediately anterior to the diaphragm 27, and in order to insure the safety of the pilot valve and diaphragm, I preferably employ a strainer 31 and pressure reducing valve 32 in the line 29 just ahead of the pilot valve 30.

The pilot valve is operated by a rotary semicircular cam 33 eccentrically mounted on a shaft 34 which extends through a suitable stuffing box in the outer end of a float arm casing 35, said shaft and cam being supported in proper alignment with the pilot valve by means of a yoke 36 which is adapted to be screwed into the float arm casing 35 by means of the threaded member 37.

A float arm 38 is operatively connected to the shaft 34 within the float arm casing 35 and terminates at its opposite end within the float cage 39 where it carries a float 40. The float cage 39 is located outside the tank and is bolted through conventional flanges to the float arm casing and is in communication with the lower portion of the tank 1 by means of an equalizing line 41 and with the intermediate portion of the tank by an equalizing line 42.

Referring to Figs. 4 and 5, it will be seen that the pilot valve 30 is supported by the yoke 36 and comprises a body portion having a vertical bore 43 terminating at its upper extremity in a spring chamber 44 and opening at its lower extremity in line with the periphery of the cam 33. On one side of this bore 43 and in communication therewith, I provide two vertically spaced transverse ports 45 and 46, the former being threaded to receive a section of the gas line 29 and serving as the inlet opening for the pilot valve, and the latter being open to atmosphere and serving as a bleed or vent for the pilot valve. On the opposite side of the bore 43, I provide a single port 47 which is threaded to receive an adjacent section of line 29 and serving as the discharge port leading to the diaphragm 27 of the motor valve 25.

Within the bore 43, I provide a vertically reciprocable inner valve 48 which is reduced intermediate its ends so as to form upper and lower valve members 49 and 50, the former projecting upwardly into the spring chamber 44 and contacting the coil spring 51 therein, while the latter projects downwardly and engages the periphery of the cam 33 under the normal tension of spring 51.

The space between the upper and lower valve members 49 and 50 is substantially the same as the distance between the inlet port 45 and the leak port 46, the discharge port 47 being located approximately in the vertical center of this space. Thus, when either one of the ports 45 or 46 is open to any extent, the other of said ports is closed, the discharge port 47 of course remaining open at all times.

As will be seen from Figs. 1 and 5 the high side H of the cam 33 is located to the left or toward the float 40, and the low side L toward the right or away from the float. Thus, as the float 40 rises, the inner valve 48 is gradually moved upwardly by the high side of the cam 33 to close the inlet port 45 and open the leak port 46, and as the liquid level in the float cage drops and with it the float 40, the cam 33 rotates in the reverse direction, permitting the inner valve 48 to move downwardly under the pressure of the spring 51, opening the inlet port 45 and closing the leak port. The former movement cuts off the gas supply to the diaphragm 27 and permits the motor valve 25 to open under its spring pressure, venting the gas from the diaphragm 27 to atmosphere through leak port 46. The latter operation opens the inlet port 45 and closes the leak port, thus establishing communication between the source of dry gas through line 29 to the motor valve diaphragm to close the oil valve 25.

In order to provide for minute adjustment of the operation of the pilot valve 30 which in turn regulates the operation of the motor valve 25, the cam 33 is made adjustable on the shaft 34.

As will be seen from Fig. 5, the cam 33 is supported on the shaft 34 by a U-shaped yoke 52 open at one end and provided at its other end with a set screw 53 which extends through the yoke and abuts the periphery of the shaft 34. After the cam is suitably adjusted on the shaft 34 by the set screw 53, it is retained in fixed position with respect to the shaft by means of a nut 54 (Fig. 4), the yoke being tightly interposed between the nut 54 and a flange 55 on the shaft 34.

In the operation of this improved dual control for the oil and gas discharge lines of a separator, as the oil rises in the lower portion of the tank 1, the float 17 in the tank and the float 40 in the float cage simultaneously rise. The float 17, through the connected arms and levers, closes the gas valve after a predetermined level is reached, and at the same time the float 40 rises and rocks the cam 33 so as to elevate its high side. This gradually moves the inner valve 38 upwardly to close the inlet port 45 of the pilot valve and open the leak port 46, whereby a supply of gas through line 29 to the motor valve diaphragm is cut off and the gas pressure bled from the diaphragm to atmosphere through leak port 46, permitting the motor valve to open under its spring pressure. Thus, so long as the gas valve 16 is closed, the pressure is permitted to build up in the separator tank to assist in forcing out and expediting the discharge of oil through the open valve 25.

Now then, as the oil drops below the predetermined level, the reverse action of these valves occurs. That is, the float 17 drops, and through its connected linkage, opens the gas valve to release the pressure in the separator, and the float 40 in the float cage also drops, rotating the cam 33 in counterclockwise direction, permitting the inner valve 48 to descend under the pressure of spring 51. This opens the inlet port 45 and closes the leak port 46, establishing communication through line 29 to the motor valve diaphragm 27, whereby sufficient pressure is created in the diaphragm chamber to close the oil discharge valve and maintain the same closed until the oil level has risen to the operating level.

It will thus be seen that with this arrangement, I have provided for minute control and adjustment of the discharge of oil and gas from the separator, the advantages of which will be readily apparent to those familiar with this type of apparatus.

It is to be understood that while I have described the various features of the preferred form of my invention in detail simply for the purpose of illustration, I do not intend to be limited to the specific structure herein described, as obviously many variations may be made in the arrangement and specific structure of parts, with equal effect. For example, it is not essential that the oil and gas lines be arranged diametrically opposite, nor is the illustrated relation of the oil valve and the pilot valve necessary. Obviously the oil valve may be operated by this same system though located more remotely from the pilot valve and float control.

Furthermore, the arrangement of valve controls may be reversed, that is, the gas valve may be arranged to be controlled by the pilot 30 with the oil valve controlled directly by the float 17, and if the reverse action of the motor valve 25 is desired, the adjustable cam 33 may be reversed so that the low side will rise as the float 40 rises to permit the movable member 48 to move downwardly under its spring pressure.

From the foregoing it is believed that the advantages and operation of my invention may be readily understood by those skilled in the art without further description, it being borne in mind that numerous changes may be made in the details disclosed without departing from the spirit of my invention as set forth in the following claims.

What I claim and desire to secure by Letters Patent is:—

1. In an oil and gas separator having an oil discharge valve and a gas discharge valve, a float in said tank for operating one of said valves in one direction, a float and float cage in communication with said tank and operable simultaneously with said first named float, a pilot valve actuated by said second float, and a fluid pressure actuated element controlled by said pilot valve for operating the other of said discharge valves in the opposite direction synchronously with the operation of said first named discharge valve.

2. In an oil and gas separator having an oil discharge valve and a gas discharge valve, a float in said separator for operating one of said valves, a float and float cage in communication with said separator and operable simultaneously with said first named float, a pilot valve actuated by said second float, and a fluid pressure actuated element controlled by said pilot valve for operating the other of said discharge valves, said pressure actuated element being in communication with the gas area of said separator and actuated by the pressure therein.

3. In an oil and gas separator having an oil discharge valve and a gas discharge valve, mechanism for the synchronized control of the separate discharge of oil and gas from said separator comprising float actuated means for controlling one of said valves directly by the rise and fall of the liquid level in the separator, fluid pressure actuated means for operating the other of said valves, a fluid pressure line placing said last named means in communication with the gas area of said separator, a pilot valve in said line, a vent in said pilot valve, a movable member in said pilot valve adapted to alternately establish communication between the source of gas pressure and said pressure actuated element and between said pressure actuated element and the atmosphere, a float cage at the exterior of said separator and in communication therewith, a float in said cage operable simultaneously with said first named float, a rotary cam actuated by said second float and operatively associated with the movable member of said pilot valve, whereby the rise and fall of liquid in said float cage controls the operation of said pilot valve.

4. In an oil and gas separator having an oil discharge valve and a gas discharge valve, mechanism for the synchronized control of the separate discharge of oil and gas from said separator comprising float actuated means for controlling said gas valve directly by the rise and fall of the liquid in the separator, fluid pressure actuated means for operating said oil valve, a fluid pressure line placing said last named means in communication with the gas area of said separator, a pilot valve in said line, a vent in said pilot valve, a movable member in said pilot valve adapted to alternately establish communication between the source of gas pressure and said pressure actuated element, and between said pressure actuated element and the atmosphere, a float cage at the exterior of said separator and in communication therewith, a float in said cage operable simultaneously with said first named float, and a rotary cam actuated by said second float and operatively associated with the movable member of said pilot valve, whereby the rise and fall of liquid in said float cage controls the operation of said pilot valve.

5. In an oil and gas separator, a fluid discharge valve, fluid pressure actuated means for operating said valve, a pilot valve for controlling the fluid pressure to said operating means, an eccentrically mounted cam member engageable with the movable member of said pilot valve for operating the latter, a float responsive to the rise and fall of the liquid level in said separator for operating said cam, and means for adjusting the axis of said cam to regulate the engagement of the latter with the movable member of said pilot valve.

6. A device as claimed in claim 5 wherein said cam is reversible to effect the reverse action of said pilot valve.

7. In an oil and gas separator having an oil discharge valve and a gas discharge valve, mechanism for effecting the simultaneous closing of said gas valve with the opening of said oil valve comprising float actuated means for controlling one of said valves directly by the rise and fall of the liquid level in the separator, fluid pressure actuated means for operating the other of said valves simultaneously in the reverse direction, a fluid pressure line placing said last named means in communication with the gas area of said separator, a pilot valve in said line, a vent in said pilot valve, a movable member in said pilot valve adapted to alternately establish communication between the source of gas pressure and said pressure actuated element, and between said pressure actuated element and the atmosphere, a float cage at the exterior of said separator and in communication therewith, a float in said cage operable simultaneously with said first named float, and a rotary cam actuated by said second float and operatively associated with the movable member of said pilot valve, whereby the rise and fall of liquid in said float cage controls the operation of said pilot valve.

8. An oil and gas separator comprising a shell, a gas chamber and a settling chamber in said shell, a gas discharge valve, an oil discharge valve, a float in said settling chamber for controlling the operation of one of said valves, fluid pressure actuated means for operating the other of said valves, a gas pressure line leading from said gas chamber to said pressure actuated element, a pilot valve in said line, a float cage at the exterior of said shell and in communication with said settling chamber, a float in said float cage operable simultaneously with said first named float, and an eccentrically mounted cam actuated by said second float and operatively associated with the movable member of said pilot valve, whereby the rise and fall of the liquid in said float cage controls the operation of said pilot valve and in turn the discharge valve associated therewith.

9. Apparatus as claimed in claim 8 wherein the axis of said cam is adjustable to regulate the engagement of the latter with said pilot valve.

10. Apparatus as claimed in claim 8 wherein the axis of said cam is adjustable to regulate the engagement of the latter with said pilot valve and reversible to effect the reverse action of said pilot valve.

MILLARD F. WATERS.